H. C. SHURTLIEFF.
Dies for Cutting and Forming Boot and Shoe Shanks.

No. 151,925.

2 Sheets--Sheet 1.

Patented June 9, 1874.

Fig. I.

WITNESSES:
Jas. E. Hutchinson
John R. Young

INVENTOR.
H. C. Shurtlieff, by
Prindle and Deane, his
Attorneys

H. C. SHURTLIEFF.
Dies for Cutting and Forming Boot and Shoe-Shanks.

No. 151,925. Patented June 9, 1874.

WITNESSES.
Jas. E. Hutchinson
John R. Young

INVENTOR.
H. C. Shurtlieff, by
Prindle and Dean, his
Attorneys.

UNITED STATES PATENT OFFICE.

HAMMOND C. SHURTLIEFF, OF AUBURN, NEW YORK.

IMPROVEMENT IN DIES FOR CUTTING AND FORMING BOOT AND SHOE SHANKS.

Specification forming part of Letters Patent No. 151,925, dated June 9, 1874; application filed May 29, 1874.

*To all whom it may concern:*

Be it known that I, HAMMOND C. SHURT-LIEFF, of Auburn, in the county of Cayuga and in the State of New York, have invented certain new and useful Improvement in Machines for Cutting and Forming Boot and Shoe Shanks; and do hereby declare that the following is a full, clear, and exact description thereof, reference being had to the accompanying drawings making a part of this specification, in which—

Figure 1:
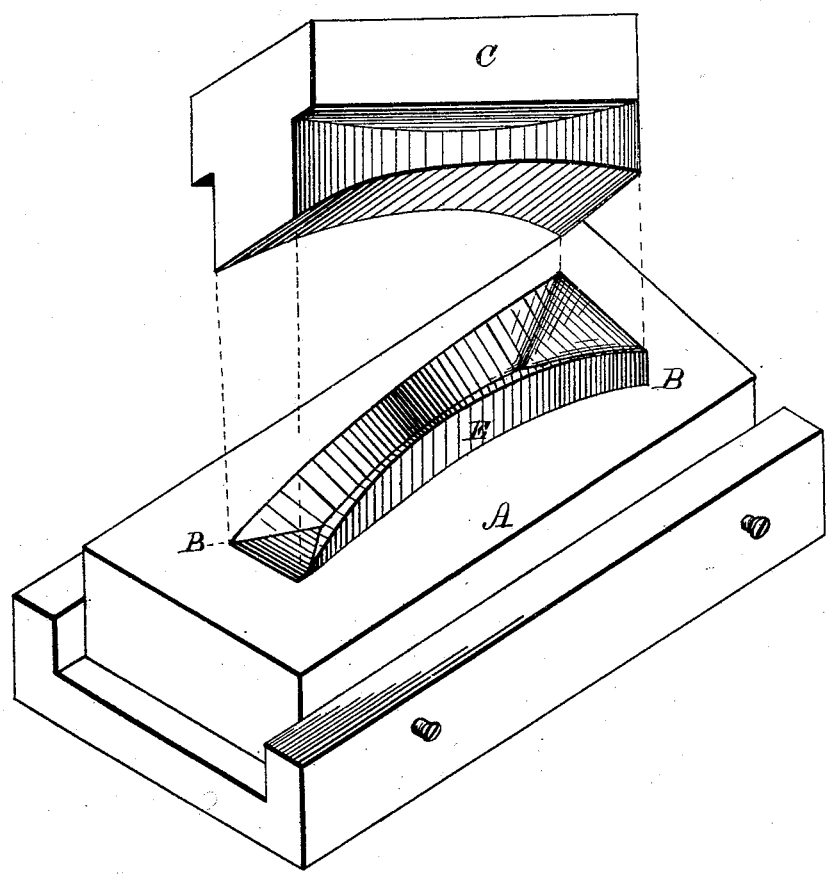
Figure 2:
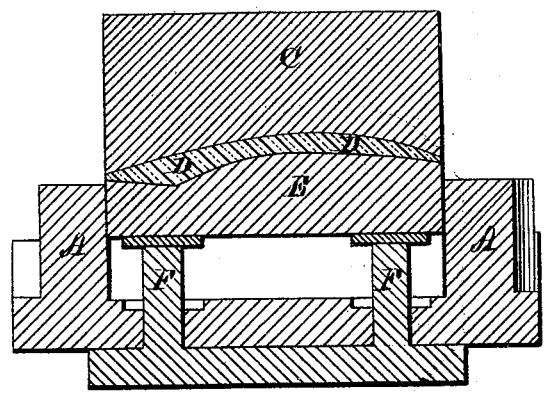
Figure 3:
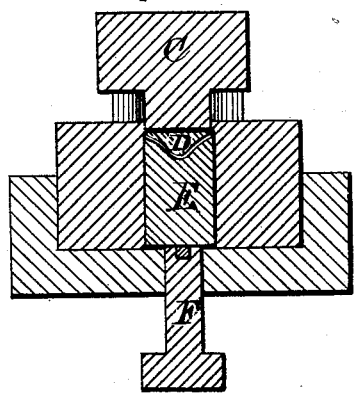

Figure 1 is a perspective view of my improved cutting and molding dies separated from each other, and Figs. 2 and 3 are, respectively, central, longitudinal, and cross sections of the same upon a vertical line.

Letters of like name and kind refer to like parts in each of the figures.

The design of my invention is to enable the shanks of boots and shoes to be cut and molded to shape at one operation; and it consists in the peculiar construction and combination of the cutting and molding dies, substantially as and for the purpose hereinafter specified.

In the annexed drawings, A represents the lower or fixed cutting-die, having a plane upper surface, within which is provided an opening, B, that has the exact size and shape of a shank in plan view, and extends vertically downward through said die. Exteriorly said die has such dimensions and shape as will best adapt it to be confined within a drop or other form of press. The upper or movable die C is constructed of or from a block of metal, the upper portion of which is formed of plane, vertical, and horizontal faces, while its lower half is reduced at its sides upon curved lines which coincide with the corresponding lines of the sides of the opening B, such conformation enabling the lower portion of said die to pass downward into, and closely fill, said opening.

As thus constructed, the lower die is suitably fixed within a press, and the upper die caused to reciprocate vertically, in the usual manner, so that if any suitable material be placed upon the former, said movable die, upon its downward stroke, will press a portion of said material which exactly corresponds to the size and shape of the opening B downward through the same, such operation being similar to that of any punching or cutting dies.

In order that the shank D may be molded to shape when thus cut, the lower face of the movable die C is recessed out upon a curved line which corresponds to the conformation of the upper surface of said shank, while within the opening B of the lower die is placed a block, E, that in horizontal shape and size corresponds to, and loosely fills, the same, is made plane upon its lower face, while its upper face has the shape of the lower face of said shank. The vertical dimensions of the block or forming die E is such as to bring its highest point just below the upper surface of the lower die A when the lower surfaces of said parts have a common level or bearing, so that a clear space is left at the upper end of the opening B for containing the shank-blank and permitting the cutting-edge of the upper die to pass entirely within said opening, so as produce a clear cut. If, now, the upper die is caused to move downward until the shank-blank is firmly compressed between the same and the forming-die E, said blank will have given to it the exact shape of the space between their contiguous faces and become a perfect shank. For fixing the shape of the shank, continued pressure, or a series of blows, may be given by the upper die, and, in connection with either of said means, heat may be applied to said dies, if desired. When the shank has been formed and the upper die raised said shank is removed from within the opening of the lower die by raising the forming-die to the position shown in Figs. 1 and 2, its upper surface being entirely above the corresponding face of said lower die. This operation may be performed by means of one or more pins, F, passing upward through the bed of the machine against the lower side of said die E, and operated by a treadle, or by any other suitable appliance that will cause said die to move vertically within the desired limits.

The apparatus described performs in a speedy and perfect manner an office that has heretofore required two or more separate machines, and at least twice the time necessary for the production of a shank by my method.

Having thus fully set forth the nature and merits of my invention, what I claim as new is—

In a machine for cutting and forming boot and shoe shanks, the lower or fixed cutting-die A, provided with the opening B, the movable cutting-die C, and the forming-die E, when constructed and combined to operate in the manner and for the purpose substantially as specified.

In testimony that I claim the foregoing I have hereunto set my hand this 3d day of November, 1873.

HAMMOND C. SHURTLIEFF.

Witnesses:
GEO. H. STRINGHAM,
HENRY BILLIARD.